(12) United States Patent
Horiki

(10) Patent No.: US 6,943,774 B2
(45) Date of Patent: Sep. 13, 2005

(54) PORTABLE COMMUNICATION TERMINAL, INFORMATION DISPLAY DEVICE, CONTROL INPUT DEVICE AND CONTROL INPUT METHOD

(75) Inventor: Toshio Horiki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 275 days.

(21) Appl. No.: 09/824,397

(22) Filed: Apr. 2, 2001

(65) Prior Publication Data

US 2002/0140667 A1 Oct. 3, 2002

(51) Int. Cl.$^7$ ................................................. G09G 5/08
(52) U.S. Cl. ...................... 345/158; 345/157; 178/18.09
(58) Field of Search .......................... 455/79, 566, 574; 345/166, 7–9, 156–158, 1.3; 178/18.09, 18.01, 345, 18.04; 348/14.05, 14.08, 14.09; D14/130, 137, 138, 144, 345, 240, 248, 247, 243, 343

(56) References Cited

U.S. PATENT DOCUMENTS

| | | | | |
|---|---|---|---|---|
| 5,168,531 A | * | 12/1992 | Sigel ............................ | 382/291 |
| 5,436,954 A | * | 7/1995 | Nishiyama et al. .......... | 455/566 |
| 5,491,507 A | * | 2/1996 | Umezawa et al. ........ | 348/14.02 |
| 5,566,098 A | * | 10/1996 | Lucente et al. .............. | 361/681 |
| 5,586,182 A | * | 12/1996 | Miyashita .................... | 379/413 |
| 5,617,312 A | * | 4/1997 | Iura et al. ..................... | 700/83 |
| 5,691,747 A | * | 11/1997 | Amano ........................ | 345/167 |
| 5,703,932 A | * | 12/1997 | Oda ............................. | 455/566 |
| 5,821,922 A | * | 10/1998 | Sellers ......................... | 345/157 |
| 5,841,849 A | * | 11/1998 | Macor .................... | 379/142.17 |
| 5,881,377 A | * | 3/1999 | Giel et al. ..................... | 455/41 |
| 5,936,619 A | * | 8/1999 | Nagasaki et al. ............ | 345/205 |
| 5,943,625 A | * | 8/1999 | Yeom et al. .................. | 455/557 |
| 6,043,805 A | * | 3/2000 | Hsieh .......................... | 345/158 |
| 6,088,018 A | * | 7/2000 | DeLeeuw et al. ........... | 345/156 |
| 6,115,025 A | * | 9/2000 | Buxton et al. ............... | 345/659 |
| 6,147,678 A | * | 11/2000 | Kumar et al. ................ | 345/158 |
| 6,262,769 B1 | * | 7/2001 | Anderson et al. ......... | 348/333.1 |
| 6,295,358 B1 | * | 9/2001 | Kubota ................... | 379/433.13 |
| 6,389,267 B1 | * | 5/2002 | Imai ............................. | 455/90 |
| 6,400,392 B1 | * | 6/2002 | Yamaguchi et al. ...... | 348/14.12 |
| 6,411,275 B1 | * | 6/2002 | Hedberg ...................... | 345/156 |
| 6,424,369 B1 | * | 7/2002 | Adair et al. ................... | 348/76 |
| 6,452,577 B1 | * | 9/2002 | Gale et al. ..................... | 345/87 |
| 6,519,480 B1 | * | 2/2003 | Wicks et al. ................. | 455/566 |
| 6,531,999 B1 | * | 3/2003 | Trajkovic ..................... | 345/157 |
| 6,600,475 B2 | * | 7/2003 | Gutta et al. .................. | 345/156 |
| 6,614,422 B1 | * | 9/2003 | Rafii et al. ................... | 345/168 |
| 6,624,833 B1 | * | 9/2003 | Kumar et al. ................ | 345/863 |
| 6,690,357 B1 | * | 2/2004 | Dunton et al. .............. | 345/158 |
| 6,720,949 B1 | * | 4/2004 | Pryor et al. .................. | 345/158 |
| 6,791,531 B1 | * | 9/2004 | Johnston et al. ............. | 345/157 |
| 2002/0126090 A1 | * | 9/2002 | Kirkpatrick et al. ........ | 345/158 |
| 2002/0140633 A1 | * | 10/2002 | Rafii et al. ...................... | 345/8 |

OTHER PUBLICATIONS

"Liquid Crystal Panel of Si Base", Nikkei Electronics, No. 778, pp. 49–56, Sep. 11, 2000.

* cited by examiner

*Primary Examiner*—Sumati Lefkowitz
*Assistant Examiner*—Leland R. Jorgensen
(74) *Attorney, Agent, or Firm*—RatnerPrestia

(57) ABSTRACT

A portable communications terminal has
  display part having a display surface for displaying an image;
  main body having at least an antenna for transmitting and receiving radio waves for wireless communications, a speaker for outputting voice, and a pointing device for controlling at least a cursor displayed on said display surface; and
  joining part for joining said display part to said main body in an angularly movable fashion, and wherein:
  said speaker is disposed on one main surface of said main body, and
  said pointing device is disposed on the other main surface of said main body opposite from said one main surface.

13 Claims, 15 Drawing Sheets

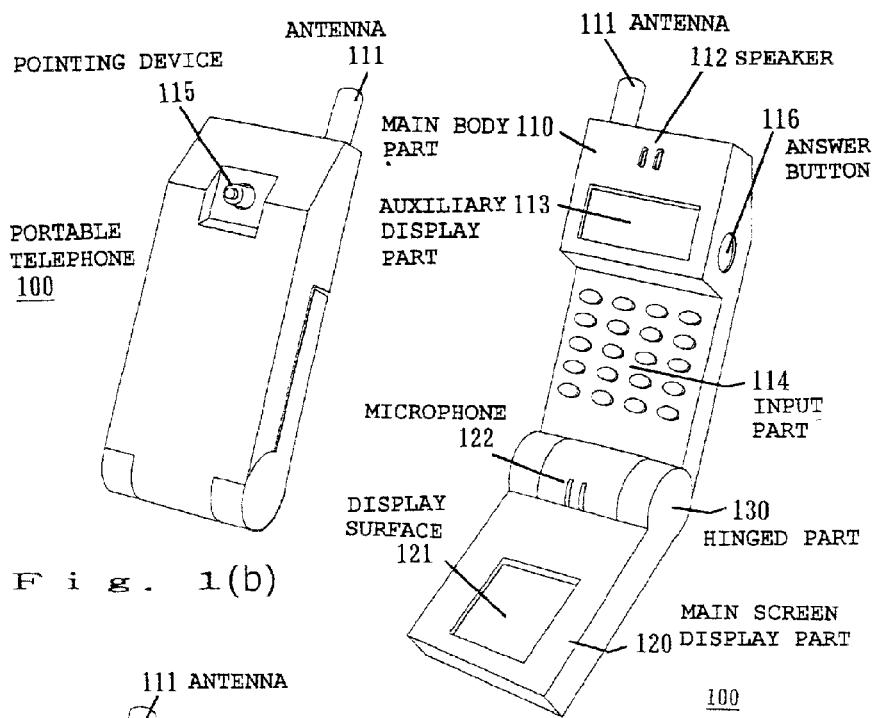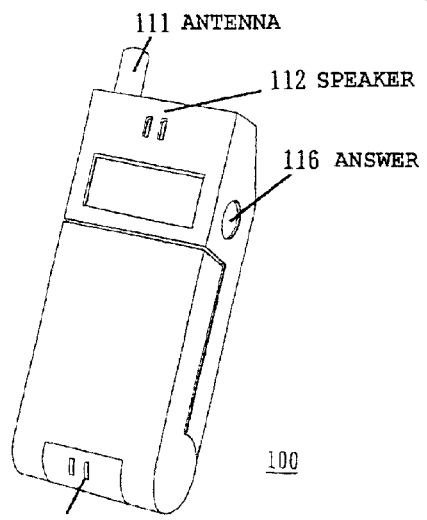

(a)

(b)

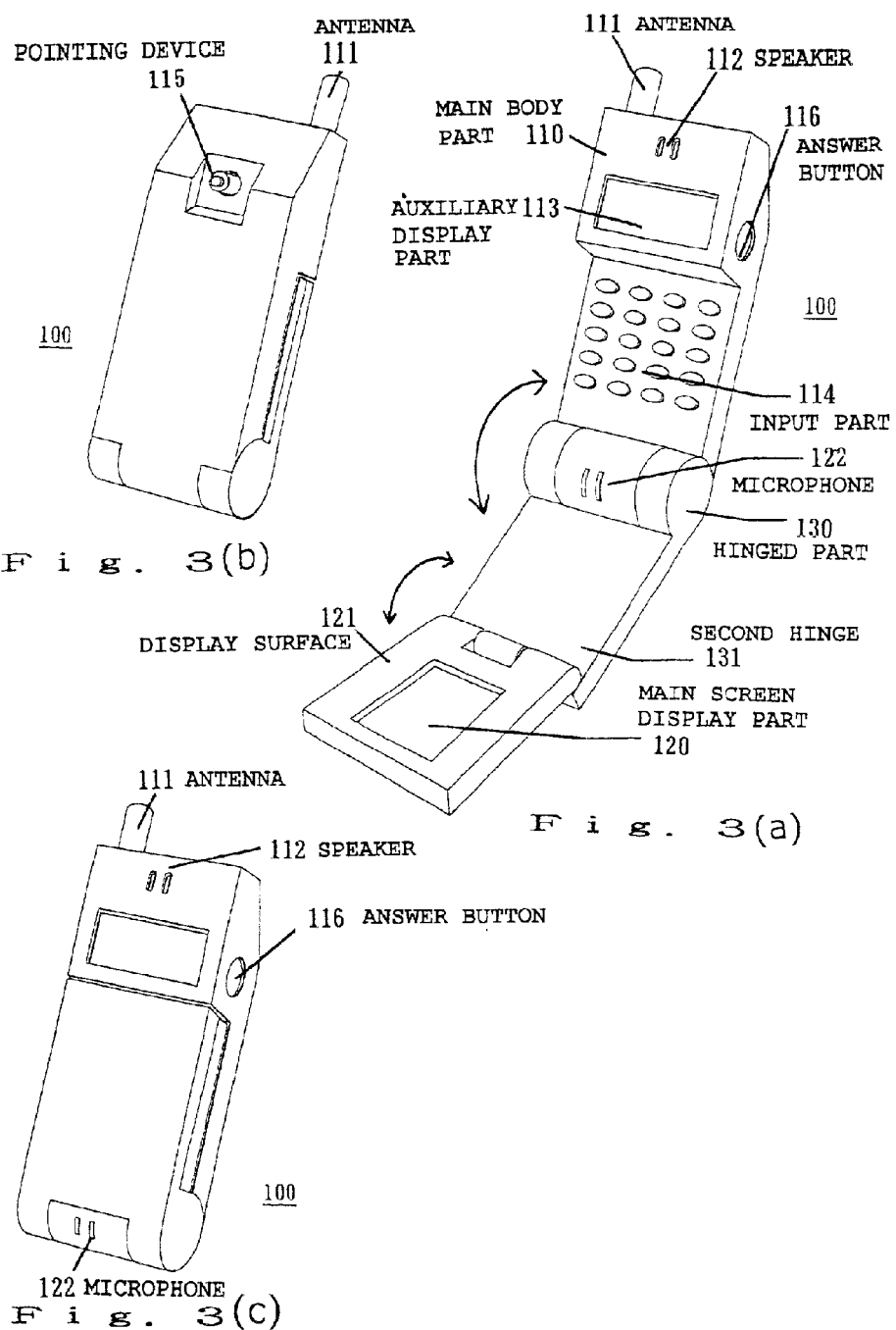

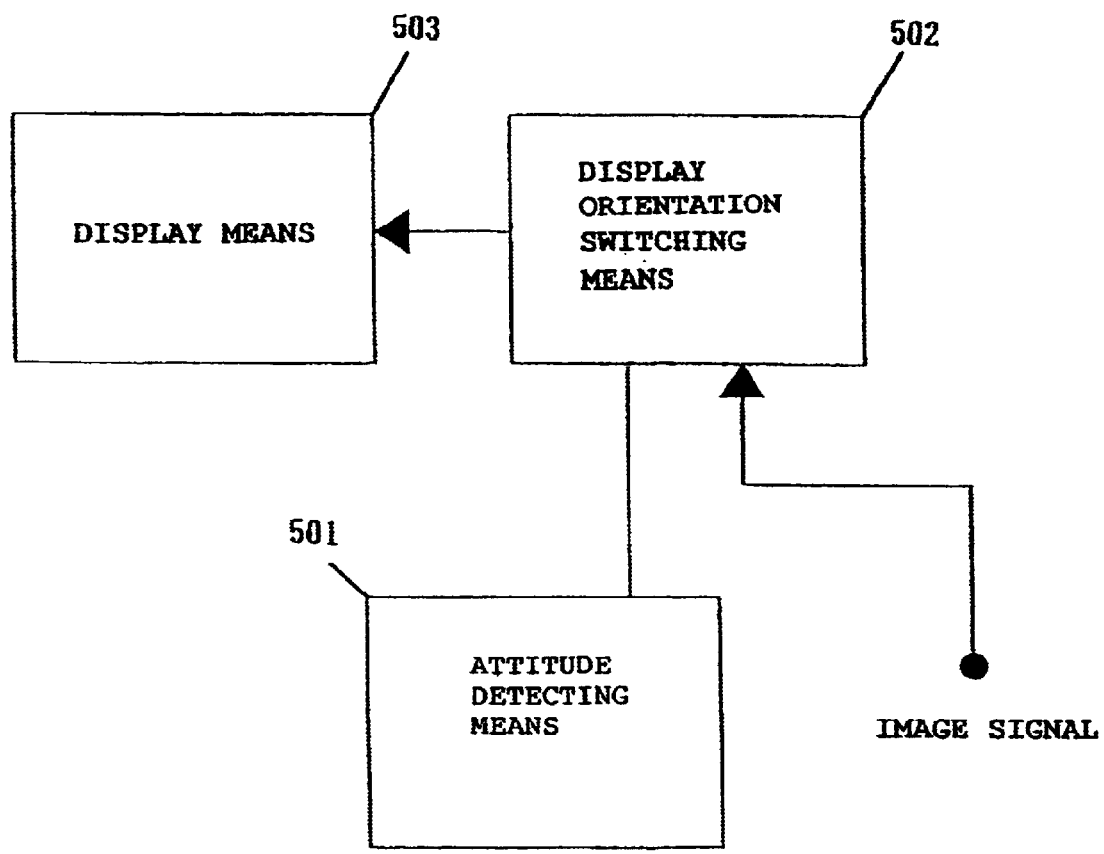

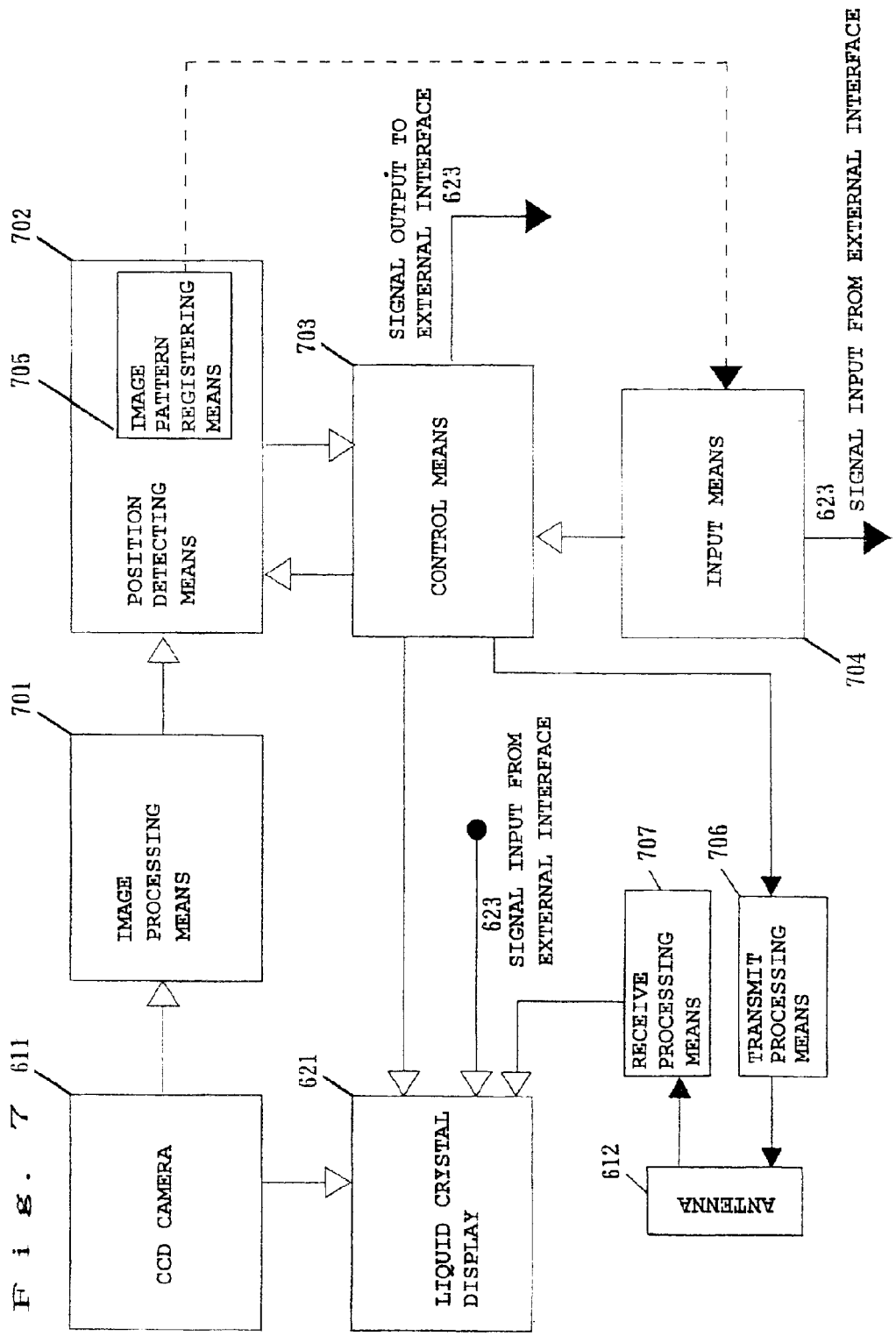

(a)

(b)

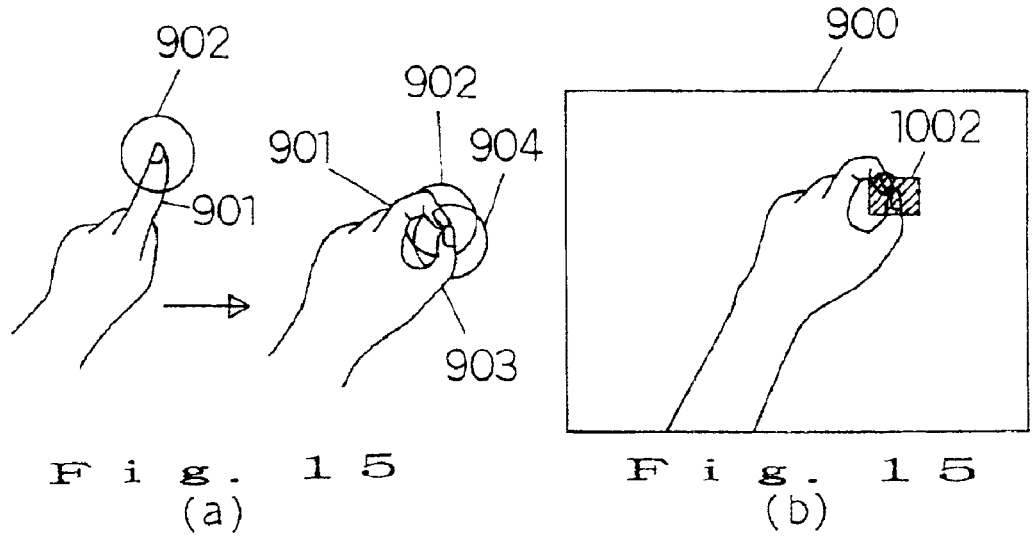
Fig. 15
(a)
Fig. 15
(b)
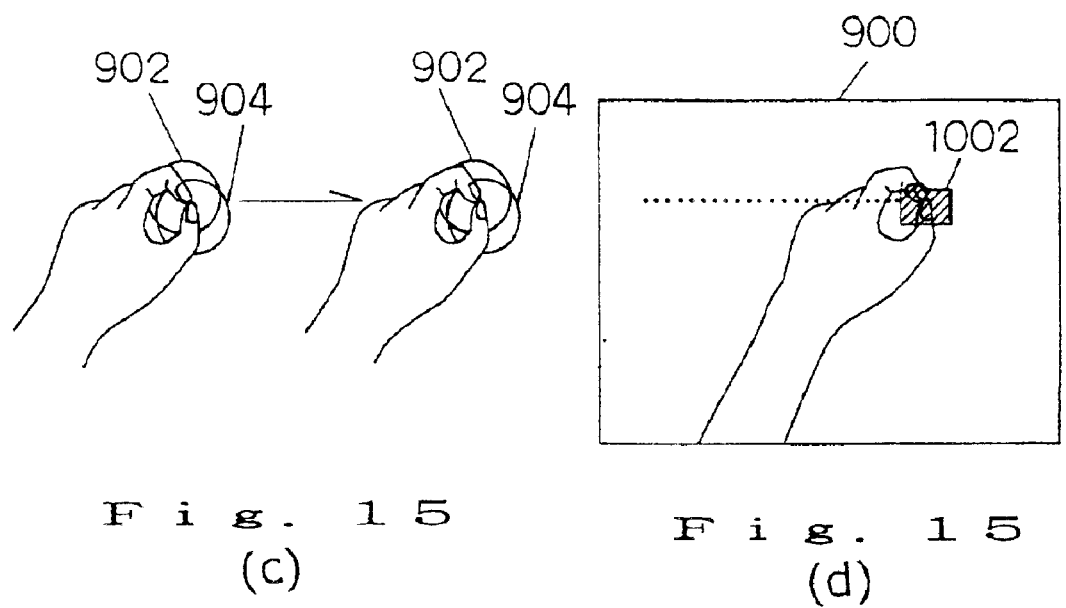
Fig. 15
(c)
Fig. 15
(d)

(a)

(b)

PORTABLE COMMUNICATION TERMINAL, INFORMATION DISPLAY DEVICE, CONTROL INPUT DEVICE AND CONTROL INPUT METHOD

BACKGROUND OF THE INVENTION

1. Field of the Invention

The present invention relates to: a portable communications terminal, exemplified by a portable telephone; an information display device for use with a portable communications terminal, a personal computer, or the like; and an input device and the like using the same.

2. Related Art of the Invention

In recent years, advances have been made for portable telephones incorporating information communications capabilities, as exemplified by the widespread use of terminals equipped with Internet connection service capabilities enabling the use of electronic mail and other services such as i-MODE and eZ-Web, a kind of web site or content which is suitable to a small screen having a small amount of pixels which is capable to be quipped on a portable telephone.

FIG. 14(a) shows the construction of a portable telephone equipped with information communications capabilities according to the prior art. As shown, the portable telephone 1400 comprises an input part 1401 having a numeric keypad, etc. for entering a telephone number, characters, and other information, a display part 1402 for displaying a telephone number, received information, etc., a speaker 1403 for hearing voice from the remote party, and a microphone 1404 for inputting voice.

In this type of portable telephone 1400, the display part 1402, usually constructed from a small transmissive liquid crystal display, is provided between the speaker 1403 and the microphone 1404, and electronic mail messages, i-MODE web pages, etc. are displayed on this display part 1402.

However, when using this type of portable telephone 1400 as an information communications terminal, the limited screen size of the display part 1402 can become a problem; that is, content specifically created for portable terminals designed for i-MODE or like service can be displayed for viewing without any problem, but when it comes to displaying other content such as web sites that are suitable to a large screen generally used for desktop PC or the like on a network, the resolution of the screen is not sufficient and the content is difficult to view on the display.

To address this problem, there has been proposed in recent years a portable telephone that uses a projection type, high resolution micro-display instead of the conventional liquid crystal display; as shown in FIG. 14(b), the micro-display 1411 is mounted near the microphone 1404 of the portable telephone 1410 and used to display information, or the projection micro-display is attached externally to the main unit of the portable telephone via a cable, and the portable telephone is used as an information terminal by operating it using the numeric keypad, etc. The projection micro-display is constructed using a small display in combination with an optical system, and produces a virtual image for viewing in a space distanced from the display, thereby achieving a large screen, high resolution virtual image display. With this technology, the display as small as about 1 cm square in size can present, when mounted in position as stated above, a high resolution image equivalent, for example, to SVGA (800×600 pixels) for viewing near the viewer's eye.

On the other hand, for an input device designed for use with such a near-to-eye display device, there has previously been proposed a construction in which an operator's motion is detected by a camera or by an electromuscular signal detector worn on the operator's body, and the thus detected motion is converted into a command to control an information processing device.

However, in the case of the prior art portable telephone shown in FIG. 14(b), since the micro-display is integrally mounted in the portable telephone main unit, it has not been possible to adjust the distance between the eye and the display screen; furthermore, since numeric keys or other input buttons are used to operate the portable telephone, the operator has had to stop looking into the projection micro-display 1411 and view the input part 1401 to operate the keys or buttons, and it has therefore been difficult to operate the portable telephone while viewing the screen, unlike the case of a personal computer.

On the other hand, when the micro-display is connected externally to the portable telephone, since the portable telephone is operated with one hand and the micro-display with the other hand, both hands have had to be used for operation, presenting a problem in operability.

As for the input device, since the detector for detecting the operator's motion and the information processing device controlled by a command associated with the detected motion are separate units, the prior art has had the problems that the entire system comprising the detector and the information processing device occupies a relatively large space, that the convenience of portability has to be compromised, and that when the detector and the information processing device are disposed at some distance away from each other because of the available space, it is difficult to verify whether the information processing device is being controlled properly by the commands associated with the operator's motions.

SUMMARY OF THE INVENTION

The present invention has been devised in view of the above-enumerated problems, and an object of the invention is to provide an easy-to-operate portable communications terminal that permits control input operations to be performed while viewing the display at the same time.

It is another object of the invention to provide a compact information display device that makes it easier to perform control input operations based on an operator's motion, and a control input device using the same.

One aspect of the present invention is a portable communications terminal comprising:

display part having a display surface for displaying an image;

main body having at least an antenna for transmitting and receiving radio waves for wireless communications, a speaker for outputting voice, and a pointing device for controlling at least a cursor displayed on said display surface; and joining part for joining said display part to said main body in an angularly movable fashion, and wherein:

said speaker is disposed on one main surface of said main body, and said pointing device is disposed on the other main surface of said main body opposite from said one main surface.

Another aspect of the present invention is the portable communications terminal according to said present invention, further comprising an auxiliary display, mounted in said main body, for displaying at least textual information.

Still another aspect of the present invention is the portable communications terminal according to said present invention, wherein said display part includes a first member where said display surface is provided, and a second member joined to said first member in an angularly movable fashion.

Yet still another aspect of the present invention is the portable communications terminal according to said present invention, wherein an answer button is provided to answer an incoming call with the display surface of said display part covered by said main body.

Still yet another aspect of the present invention is the portable communications terminal according to said present invention, wherein said joining part joins said display part to said main body in a detachable fashion.

A further aspect of the present invention is an information display device comprising:

imaging means of capturing an image;

image processing means of processing the image captured by said imaging means;

position detecting means of detecting from said processed image the position of said image on a screen;

display means of displaying prescribed information on a display surface;

control means of displaying a designated pointer on said display surface in accordance with the position detected by said position detecting means;

antenna for transmitting and receiving radio waves for wireless communications;

transmit processing means of processing a signal to be transmitted in the form of said radio waves; and receive processing means of processing the radio waves received by said antenna as a signal.

A still further aspect of the present invention is the information display device according to said present invention, wherein the display surface of said display means is chosen to be equal in size to a region within which said imaging means captures said image, or to be smaller than said capture region.

A yet further aspect of the present invention is the information display device according to said present invention, wherein said image processing means extracts a contour of said image, and said position detecting means detects said designated position from said extracted contour.

A still yet further aspect of the present invention is the information display device according to said present invention, wherein said image processing means performs processing on portions of said image that are designated by a specific color and/or a specific temperature, and/or on portions of said image that lie within a focal length of said imaging means.

An additional aspect of the present invention is the control input device comprising:

the information display device; and input means of carrying out a control input on an object pointed to by said pointer on said display surface.

A still additional aspect of the present invention is the control input device according to said present invention, further comprising image pattern registering means in which are registered one or a plurality of image patterns associated with one or a plurality of said control inputs respectively, and wherein:

said input means compares the image captured by said imaging means or the image extracted by said image processing means with the image patterns stored in said image pattern registering means and, if said extracted image matches any one of said image patterns, carries out a control input that corresponds to said matching image pattern.

A yet additional aspect of the present invention is the portable communications terminal comprising:

control input device;

main body containing at least said imaging means and said antenna;

display part containing at least said display means; and joining part for joining said main body to said display part in an angularly movable fashion.

A still yet additional aspect of the present invention is a portable communications terminal, further comprising a detection switch or detecting said main body being held by a user, said detection switch being mounted on said other main surface or a side face of said main body, and wherein:

said display part is activated when said detection switch detects said main body being held by a user, and said display part is deactivated when said detection switch no longer detects said main body being held.

A supplementary aspect of the present invention is a portable communications terminal comprising:

display part having a display surface for displaying an image;

main body having at least an antenna for transmitting or receiving radio waves for wireless communications, and speaker for outputting voice;

joining part for joining said display part to said main body in an angularly movable fashion;

attitude detecting means of detecting the attitude of said main body; and display orientation switching means of switching the orientation of said image displayed on said display part, based on a detection result output from said attitude detecting means.

A still supplementary aspect of the present invention is the portable communications terminal according to said present invention, wherein said attitude detecting means detects the attitude of said main body by using a mercury switch.

A yet supplementary aspect of the present invention is the portable communications terminal according to said present invention, wherein said orientation detecting means detects the attitude of said main body by using a gyro.

A still yet supplementary aspect of the present invention is control input method using a control input device, comprising the step of performing a prescribed gesture so as to be captured by said imaging means, wherein said control output is produced by said prescribed gesture.

One aspect of the present invention is a program for causing a computer to function as all or part of the means of the information display device, said means consisting of imaging means of capturing an image, image processing means of processing the image captured by said imaging means, position detecting means of detecting from said processed image the position of said image on a screen, and display means of displaying prescribed information on a display surface.

Another aspect of the present invention is a program for causing a computer to function as all or part of the input means of the control input device, said input means carrying out a control input on an object pointed to by said pointer on said display surface.

Still another aspect of the present invention is a program for causing a computer to function as all or part of the means of the portable communications terminal, said means consisting of attitude detecting means of detecting the attitude of said main body, and display orientation switching means of switching the orientation of said image displayed on said display part, based on a detection result output from said attitude detecting means.

BRIEF DESCRIPTION OF THE DRAWINGS

FIGS. 1(a) to 1(c) are diagrams showing the construction of a portable telephone according to a first embodiment of the present invention.

FIGS. 3(a) to 3(c) are diagrams showing another construction example of the portable telephone according to the first embodiment of the present invention.

FIG. 5 is a block diagram showing the configuration of the portable telephone according to the second embodiment of the present invention.

FIG. 7 is a block diagram showing the configuration of the information processing device according to the third embodiment of the present invention.

FIGS. 15(a) to 15(d) are diagrams for explaining another example of the operation of the information processing device according to the third embodiment of the present invention.

DESCRIPTION OF SYMBOLS

Figure 2:
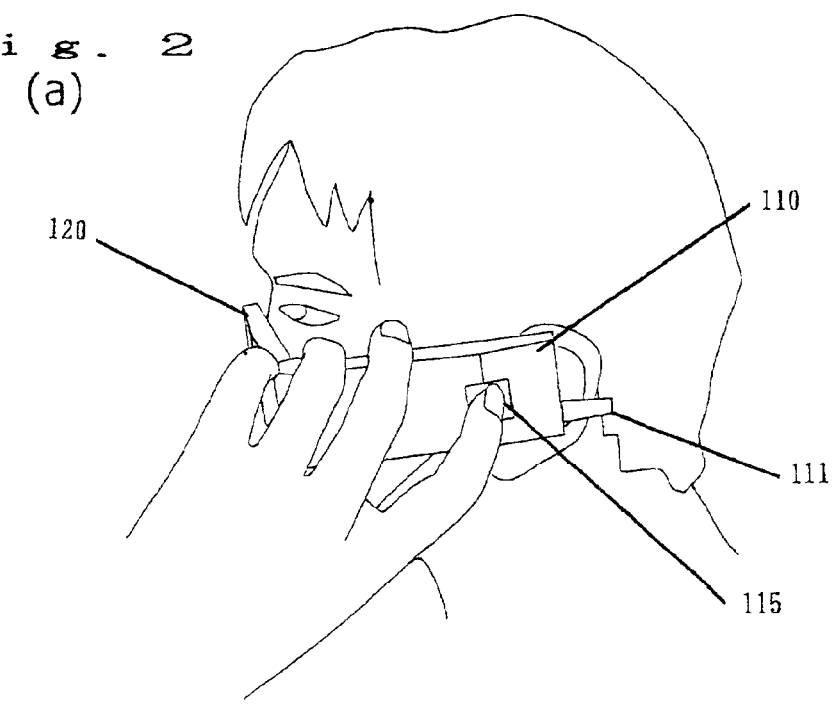
FIGS. 2(a) and 2(b) are diagrams for explaining how the portable telephone according to the first embodiment of the present invention is operated.
Figure 2:
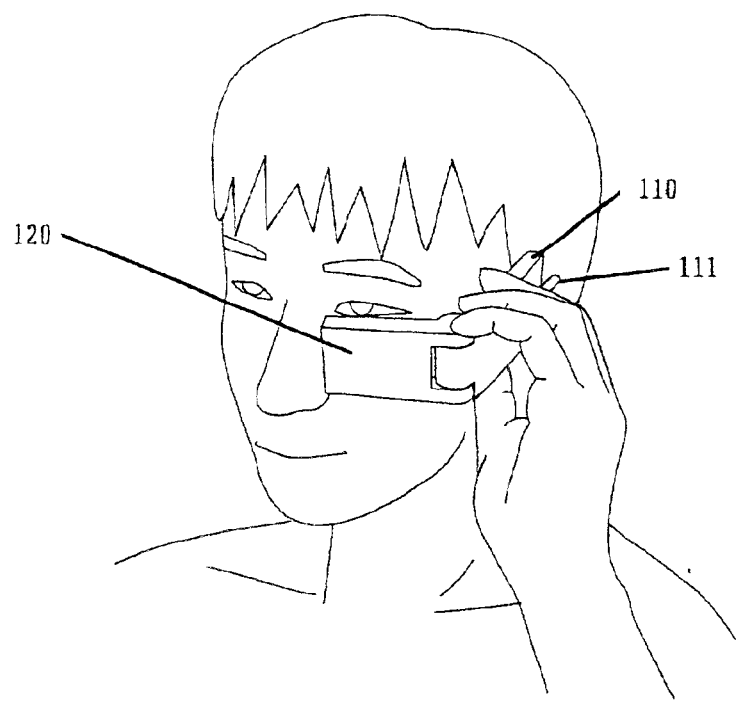

100. PORTABLE TELEPHONE
110. MAIN BODY
111. ANTENNA
112. SPEAKER
113. AUXILIARY DISPLAY
114. INPUT PART
115. POINTING DEVICE
116. ANSWER BUTTON
120. MAIN SCREEN DISPLAY PART
121. DISPLAY SURFACE
122a, 122b. MICROPHONE
131. SECOND HINGE

PREFERRED EMBODIMENTS OF THE INVENTION

The preferred embodiments of the present invention will be described below with reference to drawings.

(Embodiment 1)

FIG. 1(a) is a front perspective view of a portable telephone according to a first embodiment of the present invention, FIG. 1(b) is a rear perspective view of the same, and FIG. 1(c) is a perspective view for explaining how the portable telephone is used.

As shown in FIGS. 1(a) to 1(c), the portable telephone 100 comprises a main body 110, a main screen display part 120, and a hinged part 130 for joining the main screen display part 120 to the main body 110, and is constructed so that it can be folded over upon itself in an angularly movable fashion at the hinged part.

In the main body 110, an antenna 111 is a means of transmitting and receiving radio waves for wireless communications, a speaker 112 is a means of outputting voice, an auxiliary display 113 is a means of displaying information status such as a telephone number, etc. used primarily for telephone operating purposes, an input part 114 is a means used to perform operations to enter a telephone number, etc. and includes, for example, a numeric keypad, a pointing device 115 is a means used to perform control input operations and is implemented, for example, using a jog stick capable of manipulating the input in an X-Y two-axis plane, and an answer button 116 is a means of putting the portable telephone 100 in an off-hook condition in response to an incoming call to the portable telephone 100.

In the main screen display part 120, a display surface 121 is a means of displaying image information, and is implemented using a projection micro-display. The projection micro-display is constructed using a small display in combination with an optical system, and produces a virtual image for viewing in a space distanced from the display, thereby achieving a large screen, high resolution virtual image display. With this technology, the display as small as about 1 cm square in size can present, when mounted in position as stated above, a high resolution image equivalent, for example, to SVGA (800×600 pixels) for viewing by the viewer. Further, in the main screen display part 120, a microphone 122 is mounted in a position nearer to the hinged part 130 than to the display surface 121.

As shown in FIG. 1(b), the pointing device 115 is mounted on the reverse side of the main body 110 in a position substantially corresponding to the position of the speaker 112 mounted on the front side thereof, and as shown in FIG. 1(c), the speaker 112 is exposed even when the main screen display part 120 is folded flat with the display surface 121 nearly contacting the input part 114. In the above description, the main body 110 corresponds to the main body of the present invention, the main screen display part 120 to the display part of the present invention, the hinged part 130 to the joining part of the present invention, the pointing device 115 to the pointing device of the present invention, the auxiliary display 113 to the auxiliary display of the present invention, and the answer button 116 to the answer button of the present invention.

The operation of the thus constructed portable telephone of the first embodiment of the invention will be described below.

When using the portable telephone 100, the user puts his ear on the speaker 112 with the hinged part 130 opened to expose the display screen 121 in the same manner as with the conventional collapsible portable telephone, and holds the main body 110 in his palm with his fingers other than the forefinger. In this condition, the display screen 121 that the user is viewing can be stably held in position even in situations where vibrations tend to be applied to the portable telephone 100, for example, when the user is walking about.

When the user uses the portable telephone 100 to connect to a network such as the Internet and have information such as a Web page displayed, the user opens the hinged part 130 to expose the display screen 121 in the same manner as with a conventional collapsible portable telephone, as shown in FIGS. 1(*a*) and 1(*b*), and with the speaker 112 lightly pressed on his ear, firmly holds the portable telephone 100 by supporting the back the input part 114 with the palm of his right or left hand and putting his thumb on one side of the main body 110 and his fingers other than the forefinger on the other side thereof. In this condition, the user's eye is positioned to look into the display surface 121 so that he can view the screen of the projection micro-display.

That is, in this embodiment, whether the portable telephone is used as a telephone or as an information terminal, the main body 110 is held in substantially the same position. In this condition, the user operates the pointing device with his forefinger, while supporting the main body 110 in position with the remaining fingers.

Generally, when browsing the Web on a PC, the user uses a pointing device and performs operations such as moving the cursor displayed on the screen onto the desired function icon, and clicking the pointing device on it to make a selection from a menu or to jump to a new URL to display the desired Web site.

When the projection micro-display is used as the display screen, the display screen is positioned close to the eye, as shown in FIG. 2(*a*), but using the pointing device 115 mounted on the back of the main body 110, the user can perform control input operations while holding the portable telephone 100 in the usual way and viewing the image displayed on the display screen.

In the present embodiment, when using only the ordinary telephone function of the portable telephone, the user can use the portable telephone 100 with the main screen display part 120 folded flat on the main body 110 and with only the speaker 112 and auxiliary display 113 exposed. In this case, voice is input into the microphone 122. Since the microphone 122 is mounted in the hinged part 130, voice communication can be performed through the microphone 122 whether the display part 120 is in the folded or the opened condition.

When an incoming call arrives, the answer button 116 is operated to go off hook, and when initiating a call, a telephone number can be entered using the pointing device 115. In FIG. 1(*c*), the answer button is located on one side of the main body, but this button may be placed on the surface where the speaker 112 is mounted or in any other exposed position on the main body 110 or on the main screen display part 120. Alternatively, the function of the answer button may be incorporated into the pointing device 115. Further, if the portable telephone function is to be disabled in the condition of FIG. 1(*c*), the auxiliary display 113 and the answer button 116 may be omitted.

Further, as shown in the construction example of FIG. 3, the main screen display part 120 may be constructed using a first member 120*a* containing the display screen 121 and a second member 120*b* joined to the main body 110, the first and second members being joined together in an angularly movable fashion on a second hinge 131. This construction allows the angle between the main body 110 and the main screen display part 120 to be adjusted more precisely by using the hinged part 130 and the second hinge 131, so that the user can adjust the display surface 121 to the position easier to view.

In this way, according to the portable telephone 100 of the present embodiment, since the user can hold the main body by suitably bending his elbow in the same manner as when using the ordinary telephone function of the portable telephone, the user can perform various operations while holding the portable telephone in the usual easy-to-use position.

Furthermore, since the user can perform operations while supporting the main body with his palm and his fingers other than the forefinger, the main body can be held firmly fixed in position, stably maintaining the positional relationship between the eye and the display screen; as a result, the user can easily perform control input operations while viewing the display surface.

In the above description, the hinged part 130 is one example of the joining part of the present invention, but the joining part of the present invention is not limited to a hinge or any other specific structure; for example, a ball joint, a rubber member, etc. that can connect the main body 110 to the main screen display part 120 in an angularly movable fashion can be used as the joining part. Further, the main body 110 and the main screen display part 121 may be joined together in such a manner as to be angularly movable in twisting fashion.

In the above construction, the pointing device 115 has been described as being a joy stick that can manipulate the input in an X-Y two-axis plane, but the pointing device of the present invention need not be limited to this particular type of device; for example, a trackball such as one used in a mouse, a touch pad that detects an electrostatic or optical position when touched or pressed with a finger, or any other suitable device that can control the cursor displayed on the screen can be used as the pointing device.

Further, a detection switch may be provided on a side face of the main body 110 or on the surface where the pointing device 115 is mounted, with provisions made to turn on the micro-display in the main screen display part 120 when the detection switch detects the user holding the main body. This serves to prevent the screen display from being activated erroneously and consuming the battery.

The pointing device 115 may be mounted in any suitable position on the main surface opposite from the main surface where the speaker 112 is mounted. For example, it may be mounted in a position directly opposite the position of the speaker 112, or in a position nearer to the hinged part 130 than to the speaker 112 or farther from the hinged part 130. It may also be mounted in a position near the left or right edge of the main body 110.

(Embodiment 2)

Figure 4A:
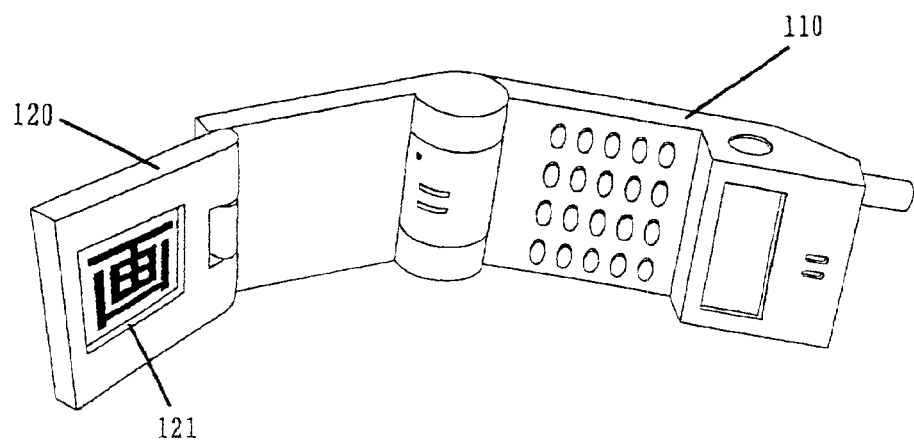
FIGS. 4(a) to 4(c) are diagrams showing the construction of a portable telephone according to a second embodiment of the present invention.
Figure 4B:
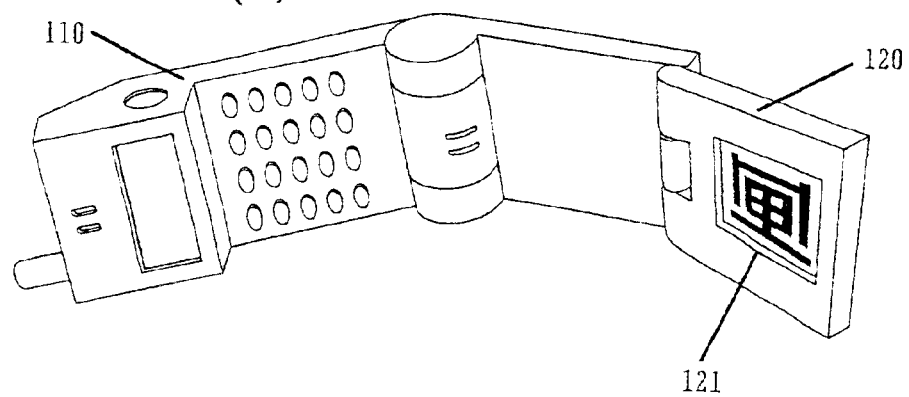
Figure 4C:
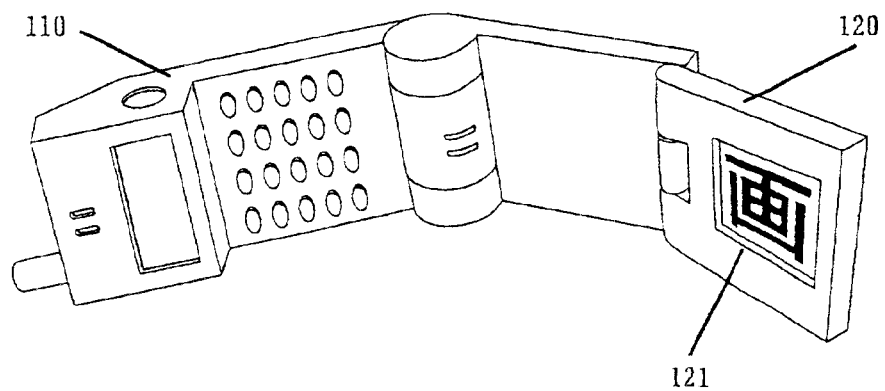

FIGS. 4(*a*) to 4(*c*) are diagrams for explaining the operation of a portable telephone according to a second embodiment of the present invention.

The basic construction of the portable telephone of this embodiment is the same as that of the first embodiment described with reference to FIG. 1; therefore, a detailed description of the construction will not be given here. FIG. 5 is a diagram showing the configuration of a portion of the portable telephone according to the present embodiment. In the figure, an attitude detecting means 501 is built into the main body 110 and detects the attitude of the main body, a display orientation switching means 502 is a means of switching the orientation of an image displayed on the display means, based on an image signal displayed on the display surface 121 and an input from the attitude detecting means 501, and the display means 503 is a means of displaying an image signal as an image on the display surface 121.

The operation of the thus configured portable telephone of the second embodiment of the invention will be described below.

When a right-handed person uses the portable telephone 100, the main body 110 is held by the right hand; therefore, as shown in FIG. 4(a), the main body 110 is located to the right-hand side of the main screen display part 120, and in this condition, images or characters are displayed on the display surface 121 of the main screen display part 120. In FIG. 4(a), a kanji character for the English word "PICTURE" is displayed as an example.

With this image displayed, if a left-handed person holds the portable telephone 100, since the main body is held by the left hand, the main body 110 is located to the left-hand side of the main screen display part 120, as shown in FIG. 4(b), and in this condition, the image is displayed upside down on the display surface 121 of the main screen display part 120.

The present embodiment is devised to prevent this deficiency. The attitude detecting means 501 built into the main body 110 detects the attitude of the main body 110. As can be seen from a comparison between FIG. 4(a) and FIG. 4(b), the main body 110 held in a horizontal position is upside down when the portable telephone 100 is held by a left-handed user as compared to the position when it is held by a right-handed user. The attitude detecting means 501 detects this upside down condition and outputs a switching signal to the display orientation switching means 502.

Upon receiving the switching signal, the display orientation switching means 502 switches the orientation of the image as directed, and outputs the thus reoriented image onto the display means 503.

As a result, a correctly oriented image can always be displayed on the display screen 121, regardless of the holding condition of the main body 110.

Specific examples of the attitude detecting means 501 include a mercury switch, a vibration gyro that uses a piezoelectric vibrator and detects a change in the attitude of itself by detecting a change when it moves, or other types of gyro such as a fiber-optic gyro that detects a change in attitude by utilizing light interference within an optical fiber. Further, the attitude detecting means 501 may be mounted in the main screen display part 120.

The above embodiment has been described as being carried out in the portable telephone of the first embodiment of the invention, but the present invention is not limited to this particular application; for example, the above embodiment may be carried out in a portable communications terminal that does not have any pointing device 115 and that comprises a main body and a main screen display part simply joined together in an angularly movable and collapsible configuration.

(Embodiment 3)

Figure 6A:
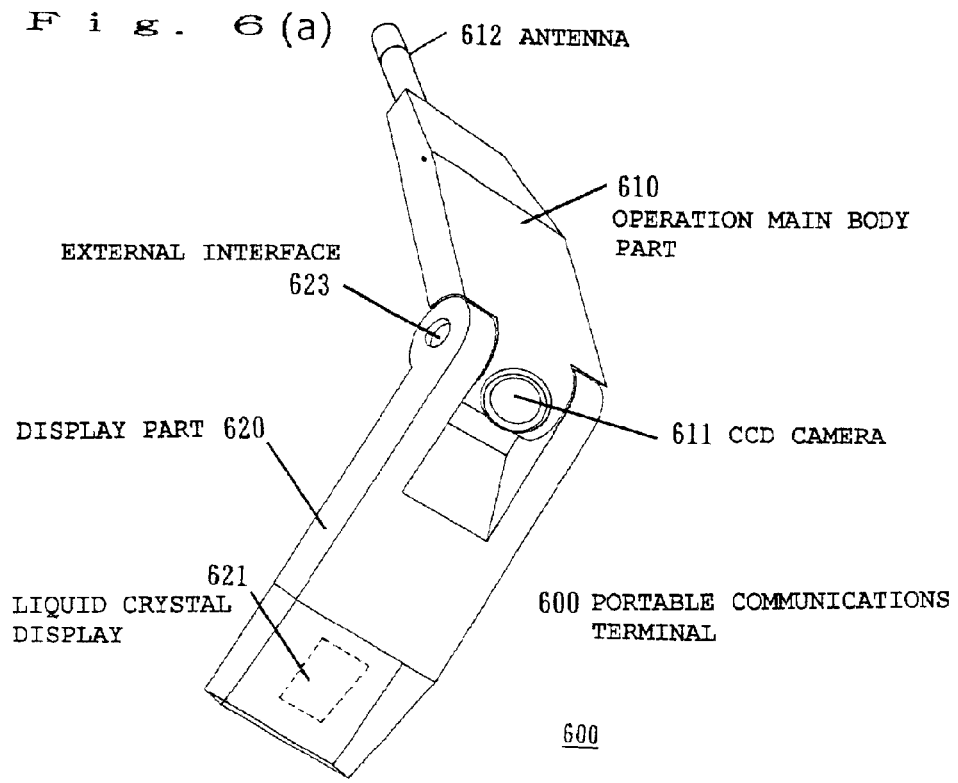
FIGS. 6(a) and 6(b) are diagrams showing the construction of an information processing device according to a third embodiment of the present invention.
Figure 6B:
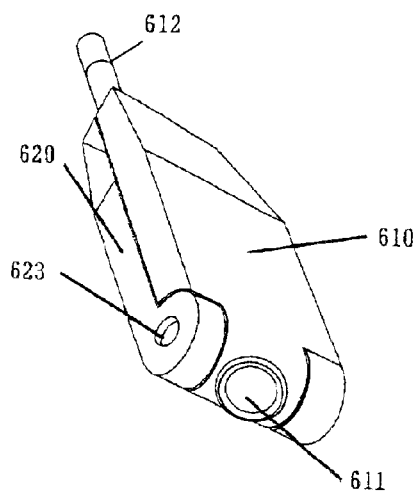

FIG. 6(a) is a perspective view showing a portable communications terminal according to a third embodiment of the present invention in a for-use configuration, and FIG. 6(b) is a perspective view of the same in a not-for-use configuration. As shown, the portable communications terminal 600 comprises an imager main body 610 and a display part 620 joined together in a collapsible configuration; in the imager main body 610, a CCD camera 611 is a means of capturing the movements of an operator's finger, etc. and an antenna 612 is a means used when communicating with an outside party by radio waves. In the display part 620, a liquid crystal display 621 is a means of displaying various kinds of information, and an external interface 623 is a means of connecting to an external device for information transfer.

FIG. 7 is a diagram showing the internal configuration of the portable communications terminal according to the present embodiment. As shown in FIG. 7, an image processing means 701 is a means of applying prescribing processing to an image captured by the CCD camera 611, a position detecting means 702 is a means of detecting the position of the image processed by the image processing means 701 on the display screen of the liquid crystal display, a control means 703 is a means of generating a pointer in accordance with the position detected by the position detecting means 702 and displaying the pointer in overlaying fashion on the display screen of the liquid crystal display 621, and an input means 704 is a means of outputting a control output from the external interface 623. A transmit processing means 706 is a means of processing the signal that the portable communications terminal 600 transmits via the antenna 612, a receive processing means 707 is a means of processing the signal that the portable communications terminal 600 received via the antenna 612, and the position detecting means 702 includes an image pattern recognizing means 705 which recognizes the pattern of a motion at a prescribed position.

The image processing means 701, position detecting means 702, control means 703, and control means 704 may be provided in the imager main body 610 or the display part 620 of the information processing device. In the above description, the CCD camera 611 is one example of the imaging means of the present invention, and the liquid crystal display 621 is one example of the display means of the present invention.

The operation of the thus configured portable communications terminal of the third embodiment of the invention will be described below.

Figure 8:
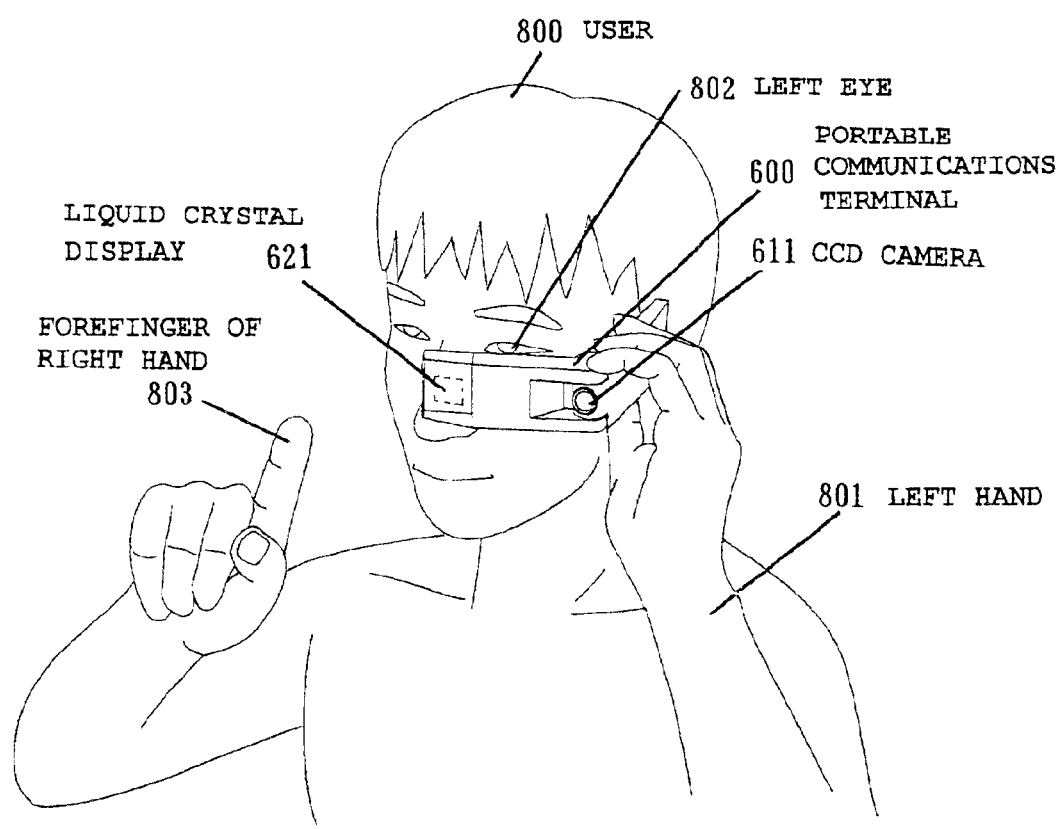
FIG. 8 is a diagram for explaining how the information processing device according to the third embodiment of the present invention is operated.

FIG. 8 shows that the user 800 is holding the portable communications terminal 600 in his left hand 801, and shooting the forefinger 803 of his right hand with the CCD camera 611 while viewing the liquid crystal display 621 with his left eye 802. In this condition, the position of the tip of the forefinger 803 being shot with the CCD camera 611 is displayed in overlaying fashion on the liquid crystal display 621, and the desired position on the display surface of the liquid crystal display 621 can be specified with the position of the fingertip. Depending on the display part 620, the shooting range of the CCD camera 611 may be set equal to the apparent size of the display surface, or the shooting range may be set larger than the apparent size of the display surface so that the CCD camera 611 covers a wider range than the display screen. In the latter case, the overlaid position can be displayed without lying off the edges of the liquid crystal display no matter where the fingertip 803 is moved within the shooting range.

Figure 9A:
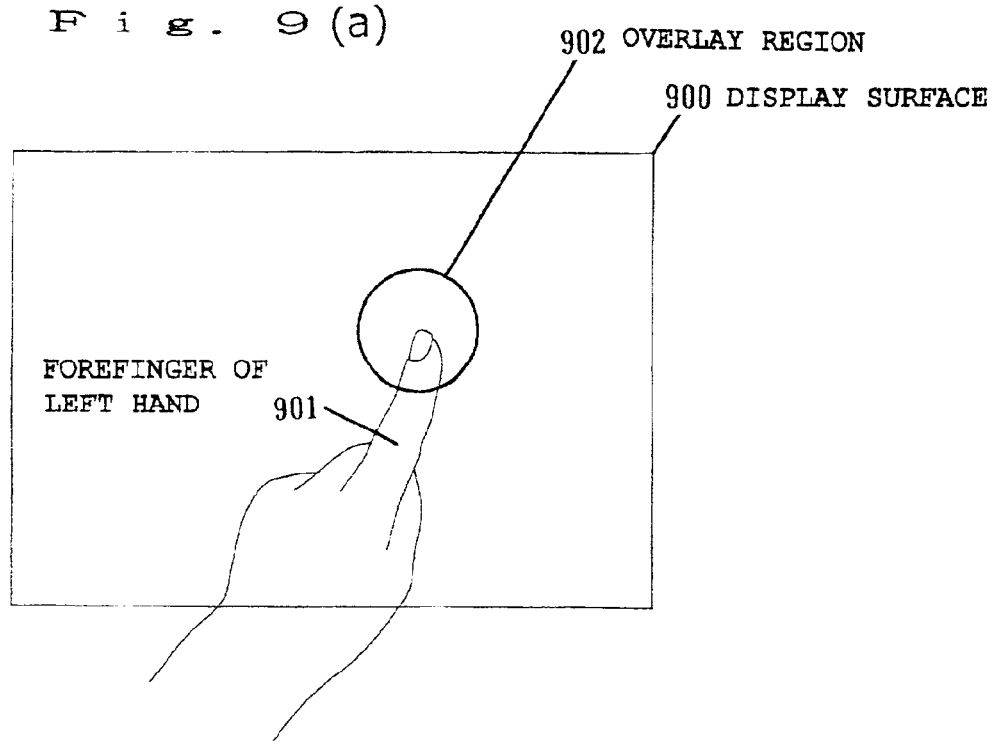
FIGS. 9(a) and 9(b) are diagrams for explaining how the information processing device according to the third embodiment of the present invention is operated.

FIG. 9(a) shows one example of the hand pattern that the portable communications terminal of this embodiment recognizes. This example shows a forefinger 901 being stuck out (pattern A), and the area surrounding the fingertip is displayed in an overlay region 902 on the display surface 900 of the liquid crystal display 621.

Figure 9B:
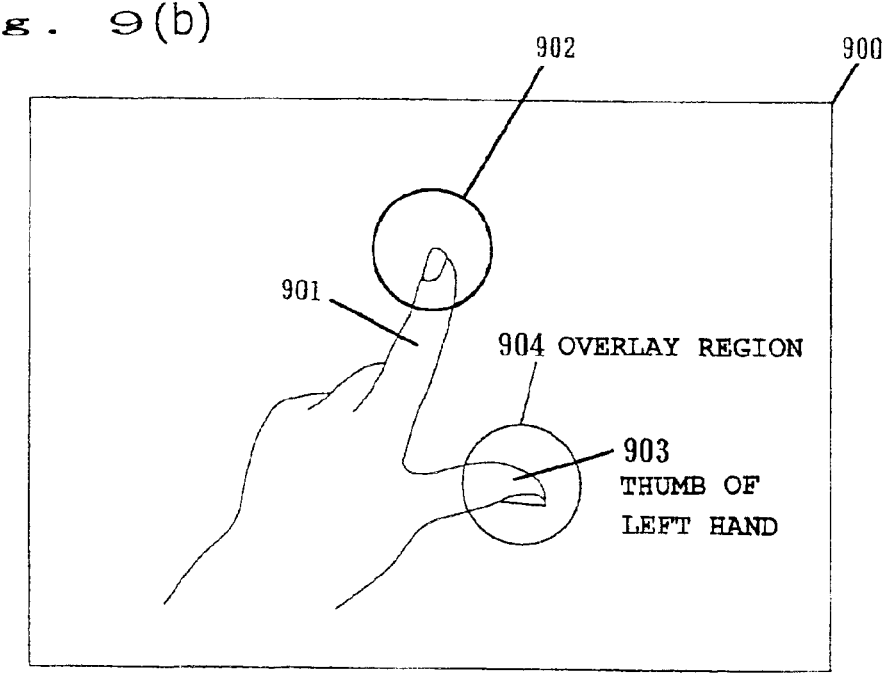
Figure 10:
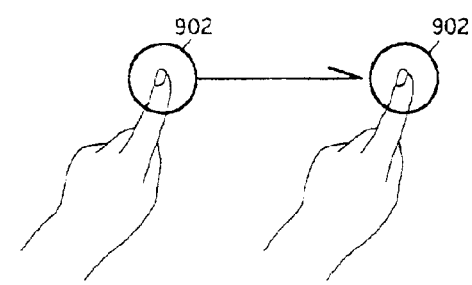
FIGS. 10(a) to 10(d) are diagrams for explaining the operation of the information processing device according to the third embodiment of the present invention.
Figure 10:
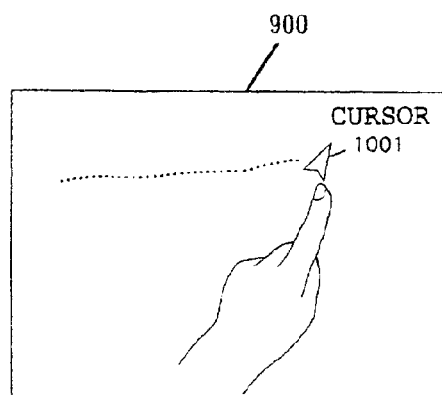
Figure 10:
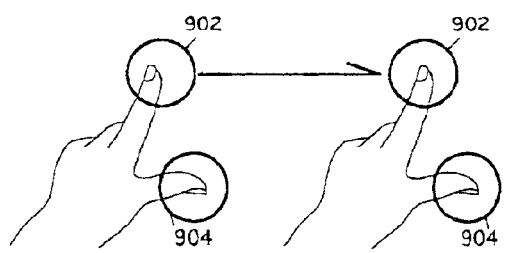
Figure 10:
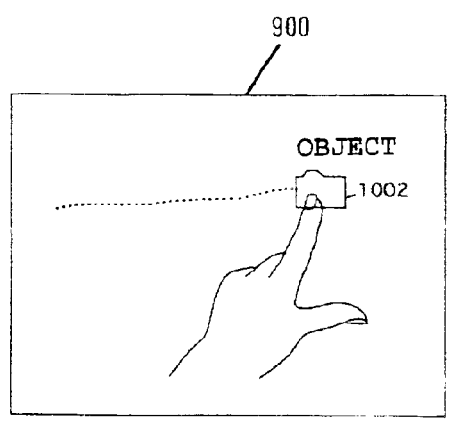
Figure 11:
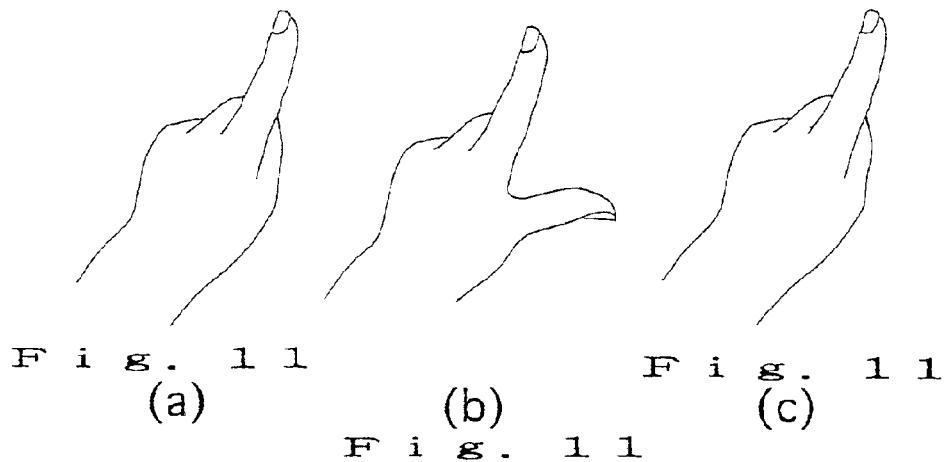
FIGS. 11(a) to 11(c) are diagrams for explaining the operation of the information processing device according to the third embodiment of the present invention.
Figure 12:
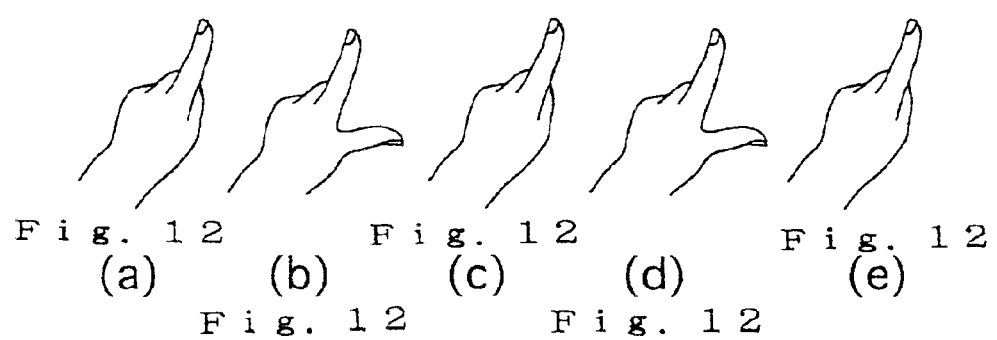
FIGS. 12(a) to 12(e) are diagrams for explaining the operation of the information processing device according to the third embodiment of the present invention.
Figure 13:
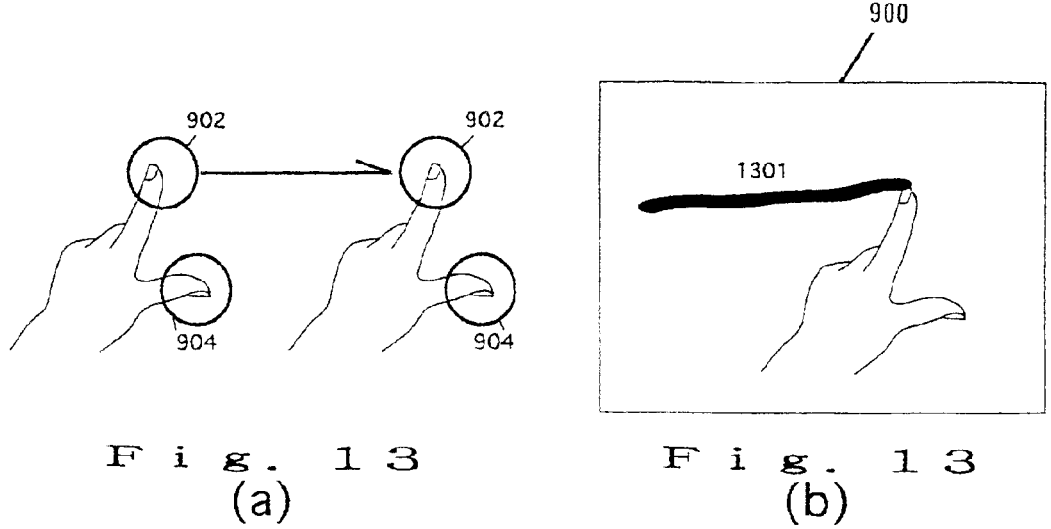
FIGS. 13(a) to 13(d) are diagrams for explaining another example of the operation of the information processing device according to the third embodiment of the present invention.
Figure 13:
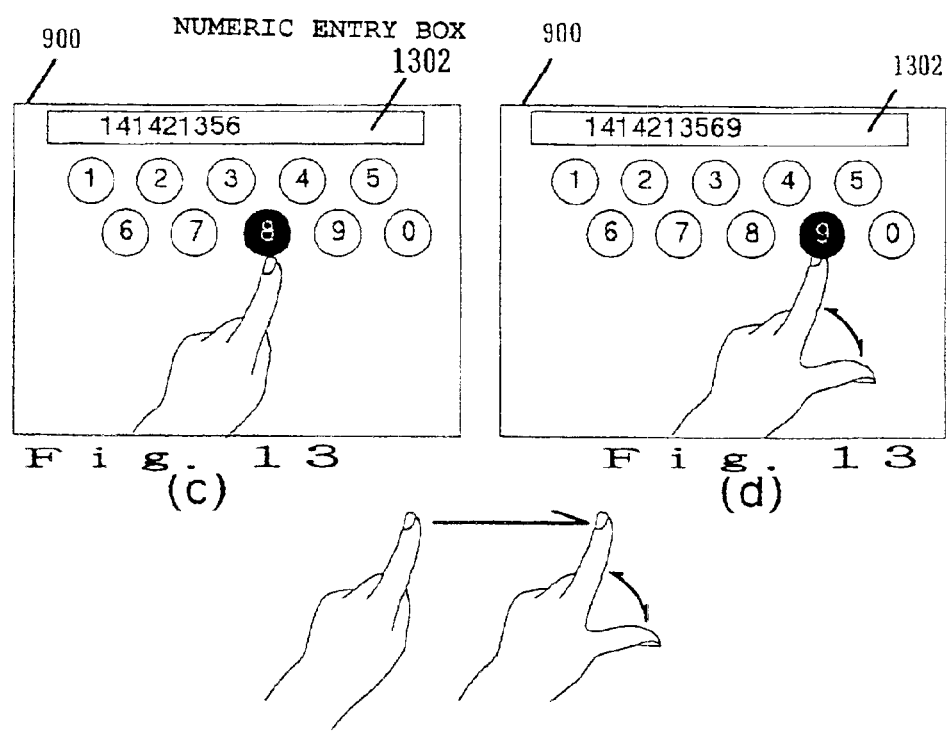
Figure 14:
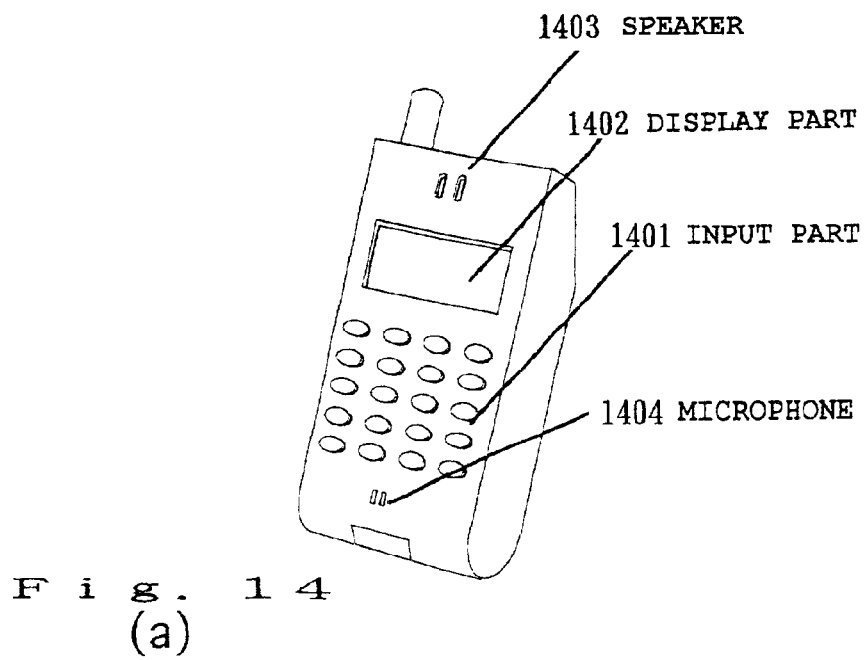
FIGS. 14(a) and 14(b) are diagrams each showing the construction of a prior art portable telephone.
Figure 14:
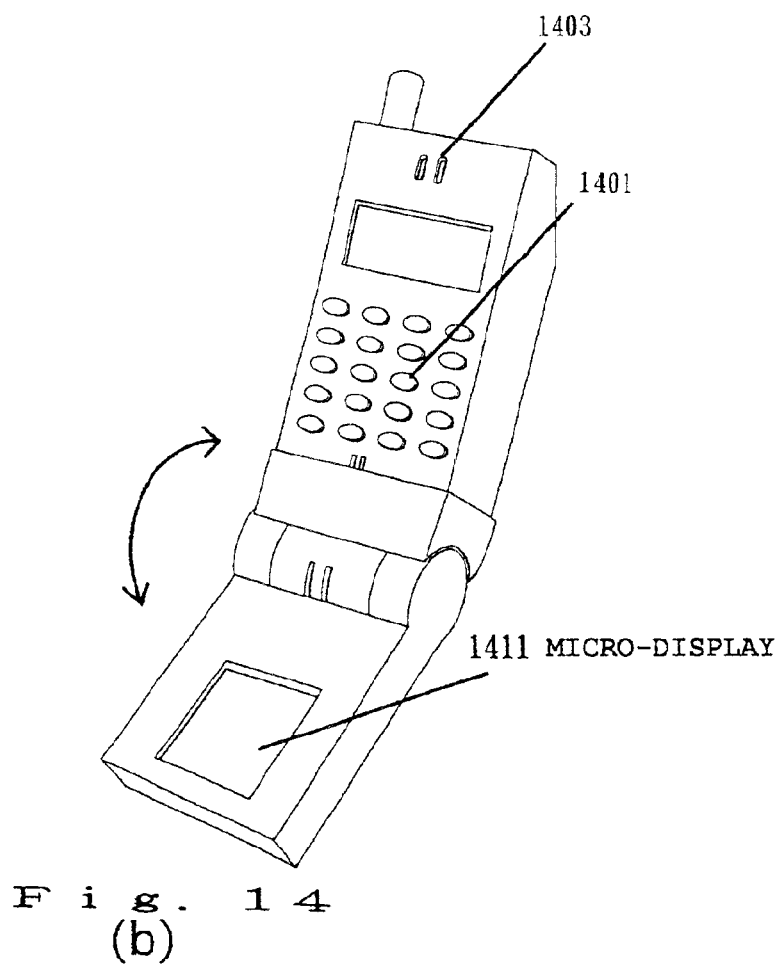

FIG. 9(b) shows another example of the hand pattern that the portable communications terminal of this embodiment recognizes. This example shows the forefinger and thumb being stuck out (pattern B), and the area surrounding the tip of the forefinger 901 and the area surrounding the thumb 903 are displayed in the overlay regions 902 and 903, respectively, on the display surface 900 of the liquid crystal display 621.

How the fingertip is displayed in overlaying fashion in FIG. 9 will be described with reference to FIGS. 7 and 9. First, when an image of the forefinger 901 is captured by the CCD camera 611, the captured image is processed by the image processing means 701, and the contour of the forefinger 901 is extracted.

The contour-processed image is supplied to the position detecting means 702 which then recognizes the tip of the contour and detects where, on the display surface 900 of the liquid crystal display 621, the tip is located. In this case, recognition of the tip may be achieved by matching it against predetermined image patterns, or by computing the curves of the contour. Further, by setting the focal length of the CCD camera 611, for example, to about 30 cm, the influence of the background on which the object is being shot can be reduced.

Next, in the control means 703, the tip position detected by the position detecting means 702 is set as a overlay region, which is then displayed on the liquid crystal display 621 by being overlaid on the display surface being shot with the CCD camera 611.

In the present embodiment, by recognizing and displaying the user's fingertip on the display surface 900 of the liquid crystal display 621 as described above, and by combining it with an interface such as a GUI (graphical user interface) loaded from an external device via the external interface 623 or from a network server via the antenna 612 and the receive processing means 707, it becomes possible to generate, based on the movements of the user's fingertip, control inputs for the device connected to the external interface 623 or the device at the remote end the transmit processing means 706 is communicating with via a radio link. The operation of generating the control inputs, as one example of the control input method of the present invention, will be described below with reference to FIGS. 10 to 13.

FIG. 10(a) is a diagram showing a fingertip gesture for directing a cursor movement according to the present embodiment. By moving the hand of pattern A from left to right, the overlay region 902, which corresponds to the cursor 1001 displayed on the GUI screen of the external device connected to the external interface 623, can be moved in the rightward direction on the GUI screen of the external device displayed in overlaying fashion on the display surface 900 of the liquid crystal display 621, as shown in FIG. 10(b).

Next, the user can perform a control input by changing the hand pattern from pattern A to pattern B. At this time, the position detecting means 702 references the image pattern registering means 705 provided within the position detecting means 702, and searches for an image pattern that matches the hand pattern change from pattern A to pattern B. If the pattern is found that matches the pattern of change from one overlay region (902) to two overlay regions (902 and 904) shown in FIG. 9(b), the input means 704 generates a control input associated with this pattern and supplies it to the control means 703 as well as to the external interface. In the illustrated example, by associating the hand pattern change from pattern A to pattern B as a control input with an object select action, an object on the GUI screen displayed in overlaying fashion on the display surface 900 of the liquid crystal display 621 can be selected by pointing to it with the forefinger 901.

When the user moves his hand from left to right while keeping the hand pattern B as shown in FIG. 9(c), the overlay region 902 as a cursor displayed on the display surface 900 of the liquid crystal display 1 is dragged to move the object 1002 in the rightward direction across the GUI screen displayed in overlaying fashion on the display surface 900 of the liquid crystal display 621, as shown in FIG. 10(d).

By preregistering such hand motion changes in the image pattern registering means 705, further complex control inputs can be created. For example, the hand pattern change from pattern A to pattern B and back to pattern A, such as illustrated in FIGS. 11(a) to 11(c), can be set as an action corresponding to a mouse single click, and the hand pattern change from pattern A through pattern B, pattern A, pattern B, and back to pattern A, such as illustrated in FIGS. 12(a) to 12(e), can be set as an action corresponding to a mouse double click.

The object select action need not be limited to the change from pattern A to pattern B; for example, the change from pattern A to pattern C in which a ring is formed with the forefinger 901 and thumb 903, as illustrated in FIG. 15(a), may be associated with the object select action. In this case, the overlay regions 902 and 904 overlap each other, thereby generating a control input for directing the selection of an object; accordingly, the user can intuitively perform the object select action by grasping the object 1002 in a virtual fashion on the display surface 900, as shown in FIG. 15(b). Furthermore, the object dragging action illustrated in FIG. 15(c) can be performed in an easy-to-understand manner as shown in FIG. 15(d).

The present embodiment is not limited in application to mouse-like operations, but may be applied to handwritten entry or keyboard or numeric key entry operations, as in an applet. For example, as shown in FIGS. 13(a) and 13(b), when graphics software is being run from the device connected to the external interface 623, the display screen can accept a line drawing input; therefore, if the hand pattern B is registered in the image pattern registering means 705 as a line drawing input, by just moving the hand pattern B in the rightward direction the user can draw a handwritten line 1301 on the graphics software display screen overlaid on the display surface 900 of the liquid crystal display 621.

Further, when the device connected to the external interface 623 is running software that requires entering numeric keys on a calculator or the like, the display screen 900 can accept numeric key entries; therefore, if the hand pattern change previously shown in FIGS. 12(a) to 12(e) is registered as an input, numeric key entries can be accomplished by the user just moving his fingers on the display screen 900 and changing the hand pattern from pattern A to pattern B, pattern A, then to pattern B. In the example shown in FIGS. 13(c) and 13(d), number "9" is entered in the numeric entry box 1302 displayed in overlaying fashion on the display screen 900 of the liquid crystal display 621. In the case of a keyboard, alphabetic characters arranged in keyboard-like fashion are displayed instead of the numeric keypad on the display screen 900.

In this way, according to the portable communications terminal of the present embodiment, the operator's action being shot with the CCD camera is displayed on the display device and, by recognizing the operator's finger motion, a control input corresponding to it can be generated.

The above embodiment has been described by assuming that the GUI of the external device connected via the external interface 623 is displayed in overlaying fashion on the liquid crystal display 621, but the portable communications terminal 600 equipped with the information display device and information input device of the present invention may be configured so that it can operate as a stand-alone device. For example, when the information input device of the present invention is incorporated in the portable telephone 100 of the first embodiment, the pointing device 116 as a control input device can be omitted from the portable telephone 100. In this case, it is desirable that the receive processing means and the transmit processing means be both configured to be able to accomplish voice communication functions as a portable telephone. It will also be appreciated that the present embodiment may be combined with the portable telephone of the second embodiment.

In the above embodiment, the portable communications terminal 600 is configured so that by using the external interface 623 or the antenna 612, transmit processing means 706, and receive processing means 707, information obtained from an externally connected device is displayed on the liquid crystal display 621 or a control input based on the operator's motion is entered into the input means 704 to produce an output for controlling the externally connected device, but it will be recognized that the information display device and information input device of the present invention need not necessarily communicate and transfer information to and from an external device. That is, the transmit processing means and receive processing means of the present invention need not process information, including prescribed information, handled by the imaging means, image processing means, position detecting means, display means, and control means of the present invention.

For example, if the portable communications terminal 600 is constructed by omitting the external interface 623, and by limiting the functions of the antenna 612, transmit processing means 706, and receive processing means 707 to those as a portable telephone, the portable communications terminal 600 of such construction is also included in the prevent invention. In this case, the information display device and information input device of the present invention will be used as user interfaces when the portable communications terminal 600 is used as a stand-alone information processing device.

In the above embodiment, the CCD camera 611 is one example of the imaging means of the present invention, but the imaging means of the present invention is not limited to this particular type of device; for example, an imaging device using C-MOS, or any other device that can optically capture an image and convert it into data ready for subsequent processing by the image processing means, can be used as the imaging means. Use can also be made of devices, such as a thermograph using a pyroelectric device, that can thermally capture an image and convert it into data ready for subsequent processing by the image processing means. Here, the image processing means may be configured to process only portions of specific wavelength (color) so that portions necessary for position detection can be extracted from the image captured by the imaging means. Further, the liquid crystal display 621 is one example of the display means of the present invention, but the display means of the present invention is not limited to this particular type of display; for example, a projection type display, similar to the one used in the first or second embodiment, may be used as the display means.

In the above embodiment, the image pattern registering means 705 has been described as being contained in the position detecting means 702, but it may be provided within the input means 704 or between the position detecting means 702 and the input means 704, that is, its arrangement need not be limited to a particular position.

Further, in the above embodiment, the portable communications terminal 600 has been described assuming that the input means is incorporated in the information display device of the present invention, but the input means 704 may be omitted from the information display device of the present invention, which then comprises the imaging means, image processing means, position detecting means, control means, display means, transmit processing means, and receive processing means.

The portable communications terminal 600 is one example of the portable communications terminal of the present invention, and the input means 704 is one example of the input means of the present invention and has been described as operating based on an input from the position detecting means 702, but the input means of the present invention may be configured to operate based on an external input such as a button input from the user.

Figure 16:
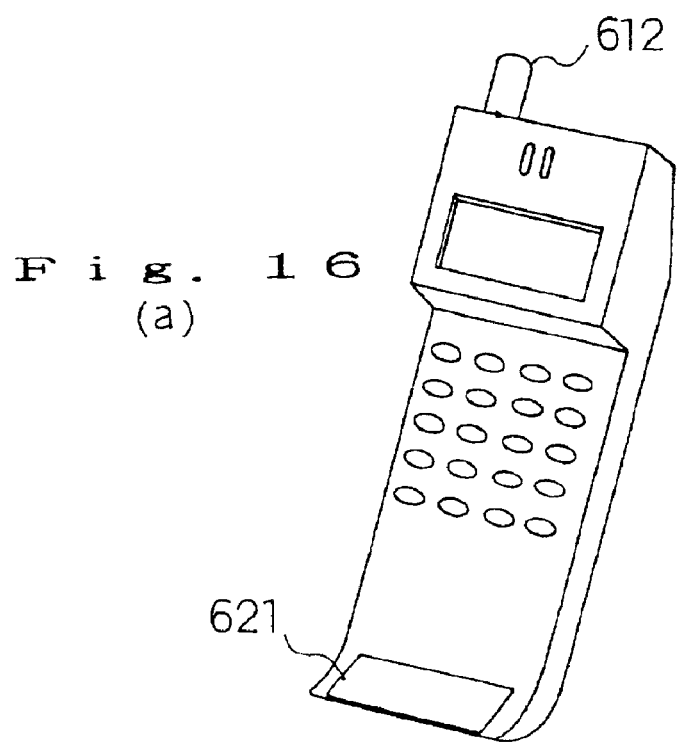
FIGS. 16(a) and 16(b) are diagrams showing an alternative construction of the information processing device according to the third embodiment of the present invention.
Figure 16:
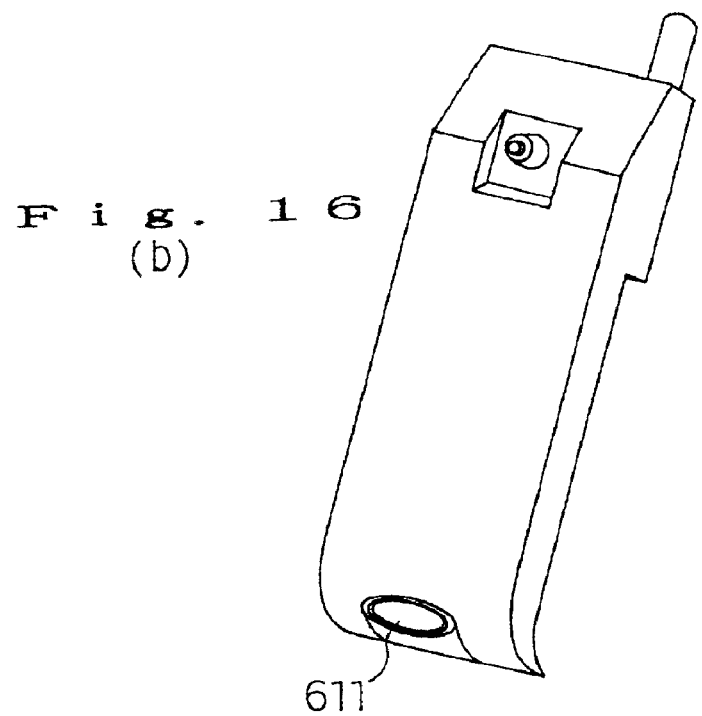

Further, the control input device of the present invention may be implemented in a construction that does not have a folding part as in an ordinary portable telephone, not in the form of a collapsible portable communications terminal like the portable communications terminal 600. The example of FIG. 16(a) shows a portable telephone 1600 that does not have a folding part, and in which the liquid crystal display 621 is mounted in the bottom, while the CCD camera 611 is mounted on the back of the bottom part as shown in FIG. 16(b).

Although the invention has been described above with particular reference to the preferred embodiments of the portable telephone and portable communications terminal, the present invention may also be embodied in the form of a program for causing a computer to carry out the functions of all or part of the means of the portable communications terminal, information display device, and control input device of the invention described above, wherein the program operates in collaboration with the computer.

Here, the wording "part of the means (or devices, elements, circuits, etc.) of the invention" refers to some of the plurality of means or some of the functions or operations of one of the means.

The invention has also been described with reference to the preferred embodiments of the control input method, but the present invention may also be embodied in the form of a program for causing a computer to carry out the operations in all or some of the steps (or processes, operations, effects, etc.) of the control input method of the invention described above, wherein the program operates in collaboration with the computer.

Here, the wording "some of the steps (or processes, operations, effects, etc.) of the invention" refers to some of the plurality of steps or some of the operations in one of the steps.

A computer readable recording medium having the program of the invention recorded thereon also falls within the scope of the present invention.

In one utilization mode of the program of the invention, the program is recorded on a recording medium readable by a computer, and is operated in collaboration with the computer.

In another utilization mode of the program of the invention, the program is transmitted through a transmission medium, is read by a computer, and is operated in collaboration with the computer.

The recording medium includes a ROM or the like, and the transmission medium includes a transmission medium such as the Internet, light waves, radio waves, or sound waves.

The computer of the invention described above is not limited to pure hardware such as a CPU, but may be implemented as firmware, an OS, or even a peripheral device.

Accordingly, as described above, the configuration of the invention may be implemented in software or in hardware.

As is apparent from the above description, according to the present invention, the user can operate the pointing device with the same hand that is holding the main body, while viewing more information on the screen.

Furthermore, by making provisions to capture the operator's motion for display on the display device, recognize the operator's motion, and display a cursor responding to it, input operations can be performed easily.

What is claimed is:

1. An information display method comprising the steps of:
   imaging and capturing an image of an object;
   processing the image captured by said imaging step;
   displaying prescribed information on a projection micro-display, separately obtained from the imaging step;
   displaying a designated pointer on said display and controlling the pointer using only the same hand that holds the projection micro-display; and
   controlling information on the display comprising the steps of:
   (a) storing as a control input a sequential change, first (i) of a first hand pattern, formed of at least one finger, and then second (ii) of a second hand pattern, formed of at least one finger, the second hand pattern different from the first hand pattern;
   (b) imaging, by the camera, the first hand pattern;
   (c) imaging, by the camera, the second hand pattern;
   (d) recognizing the first hand pattern imaged in step (b);
   (e) recognizing the second hand pattern imaged in step (c);
   (f) comparing a sequential change of first step (d) and then second step (e) to the stored control input;
   (g) controlling the information on the display, after the comparing of step (f);
   (h) positioning the display between an eye of a user and a hand of the user;
   (i) viewing the at least one finger of the hand on the display, while forming the first and second hand patterns; and
   (j) visually aligning the eye of the user, the display and the first and second hand patterns.

2. The information display method according to claim 1, wherein the image captured by said imaging step is a fingertip, a first hand pattern and a second hand pattern.

3. The information display method according to claim 1, wherein said display step makes said display surface be equal in size to a region within which said imaging step captures said image, or be smaller than said capture region.

4. The information display method according to claim 1, wherein said image processing step extracts a contour of said image, and
   a position detecting step detects the position of said image on a screen from said extracted contour.

5. The information display method according to claim 1, wherein said image processing steps performs processing on portions of said image that are designated by a specific color and/or a specific temperature, and/or on portions of said image that lie within a focal length of said imaging means.

6. The control input method comprising:
   the information display method according to anyone of claims 1 to 5; and
   input step of carrying out a control input on an object pointed to by said designated pointer on said display surface.

7. The control input method according to claim 6, wherein said designated pointer is displayed by detecting a fingertip as said image.

8. The control input method according to claim 6, wherein said position detecting step compares the image captured by said imaging step or the image extracted by said image processing step with a plurality of image patterns corresponding to said control inputs respectively, and when said captured or extracted image matches any one of said image patterns, said input step carries out a control input that corresponds to said matched image pattern.

9. The control input method according to claim 6, wherein said position detecting step compares the images captured by said imaging step or the images extracted by said image processing step with a combination of a plurality of image patterns corresponding to one of said control input, and when said captured or extracted image match any one of said combination of image patterns, said input step carries out a control input that corresponds to said matched combination of image patterns.

10. The information display method according to any one of claims 1 to 5, wherein said display is used for a portable communication terminal or a portable telephone.

11. A portable telephone having camera and a display, a method of controlling information on the display comprising the steps of:
    (a) storing as a control input a sequential change, first (i) of a first hand pattern, formed of at least one finger, and then second (ii) of a second hand pattern, formed of at least one finger, the second hand pattern different from the first hand pattern;
    (b) imaging, by the camera, the first hand pattern;
    (c) imaging, by the camera, the second hand pattern;
    (d) recognizing the first hand pattern imaged in step (b);
    (e) recognizing the second hand pattern imaged in step (c);
    (f) comparing a sequential change of first step (d) and then second step (e) to the stored control input;
    (g) controlling the information on the display, after the comparing of step (f);
    (h) positioning the display between an eye of a user and a hand of the user;
    (i) viewing the at least one finger of the hand on the display, while forming the first and second hand patterns; and
    (j) visually aligning the eye of the user, the display and the first and second hand patterns.

12. The method of controlling information on the display of claim 11, wherein
    step (a) includes storing as a further control input a further sequential change first (i) of the second hand pattern, and then second (ii) of the first hand pattern;
    step (b) includes imaging another first hand pattern;
    step (c) includes imaging another second hand pattern;
    step (d) includes recognizing the other first hand pattern imaged in step (b);

step (e) includes recognizing the other second hand pattern imaged in step (c);

comparing a further sequential change of first step (e) and then second step (d) to the stored further control input; and controlling the information on the display, based on the further sequential change.

13. The method of controlling information on the display of any one of claims 11–12 wherein controlling the information on the display includes controlling the information on a projection micro-display, and superimposing a cursor on the display surface of the projection micro display to control the information;

the method further including:

visually observing both the cursor and the one finger forming the first hand pattern and the second hand pattern, and moving both the cursor and the one finger imaged on the display to control the information on the display.

* * * * *